(12) United States Patent
Mohamad et al.

(10) Patent No.: US 10,931,405 B2
(45) Date of Patent: Feb. 23, 2021

(54) RELAYING METHOD AND DEVICE AND DESTINATION WITH FEEDBACK IN AN OMAMRC SYSTEM

(71) Applicant: Orange, Paris (FR)

(72) Inventors: Abdulaziz Mohamad, Les Ulis (FR); Raphael Visoz, Vanves (FR); Antoine Berthet, Chatenay Malabry (FR)

(73) Assignee: ORANGE, Paris (FR)

( * ) Notice: Subject to any disclaimer, the term of this patent is extended or adjusted under 35 U.S.C. 154(b) by 111 days.

(21) Appl. No.: 16/061,234

(22) PCT Filed: Dec. 9, 2016

(86) PCT No.: PCT/FR2016/053313
§ 371 (c)(1),
(2) Date: Jun. 11, 2018

(87) PCT Pub. No.: WO2017/098188
PCT Pub. Date: Jun. 15, 2017

(65) Prior Publication Data
US 2018/0367254 A1    Dec. 20, 2018

(30) Foreign Application Priority Data

Dec. 11, 2015 (FR) ...................................... 1562224

(51) Int. Cl.
| | |
|---|---|
| *H04L 1/08* | (2006.01) |
| *H04L 1/18* | (2006.01) |
| *H04L 1/00* | (2006.01) |
| *H04B 7/14* | (2006.01) |
| *H04L 5/16* | (2006.01) |
| *H04L 25/20* | (2006.01) |
| *H04B 7/26* | (2006.01) |
| *H04B 7/155* | (2006.01) |

(52) U.S. Cl.
CPC .................. *H04L 1/08* (2013.01); *H04B 7/14* (2013.01); *H04L 1/0076* (2013.01);
(Continued)

(58) Field of Classification Search
CPC ..... H04L 2001/0097; H04L 5/14; H04L 5/16; H04L 1/0009; H04L 1/0026; H04L 25/20;
(Continued)

(56) References Cited

U.S. PATENT DOCUMENTS

| | | | |
|---|---|---|---|
| 7,924,761 B1 | 4/2011 | Stevens | |
| 2006/0291440 A1* | 12/2006 | Hausl | H03M 13/3761 370/340 |

(Continued)

FOREIGN PATENT DOCUMENTS

EP    2733881 A1    5/2014

OTHER PUBLICATIONS

International Search Report dated Mar. 30, 2017, for corresponding International Application No. PCT/FR2016/053313 filed Dec. 9, 2016.
(Continued)

*Primary Examiner* — April Y Blair
*Assistant Examiner* — Sazzad Hossain
(74) *Attorney, Agent, or Firm* — David D. Brush; Westman, Champlin & Koehler, P.A.

(57) ABSTRACT

A method for relaying messages via a half-duplex relay for a telecommunications system with M sources, L relays and a destination, where M>1, L≥1, according to an orthogonal multiple access scheme of the transmission channel between the L relays and the destination. The method includes: decoding, via a relay, M messages each being associated with a frame and coming from a source among the M sources with detection of errors on the messages; transmitting from the relay to the destination a signal representative of a least one portion of a set of the messages for which no errors have been detected by the relay conditional on authorization from the destination, transmitting from the relay to the destination of a monitoring signal indicating a set of messages for which no errors have been detected by this relay, this transmission of the monitoring signal occurring before the transmission of the representative signal.

10 Claims, 3 Drawing Sheets

(52) U.S. Cl.
CPC .............. *H04L 1/1864* (2013.01); *H04L 5/16* (2013.01); *H04B 7/15592* (2013.01); *H04B 7/2606* (2013.01); *H04L 1/0009* (2013.01); *H04L 1/0026* (2013.01); *H04L 25/20* (2013.01); *H04L 2001/0097* (2013.01)

(58) Field of Classification Search
CPC ....... H04L 1/08; H04L 1/0076; H04L 1/1864; H04B 7/15592; H04B 7/14; H04B 7/2606
See application file for complete search history.

(56) References Cited

U.S. PATENT DOCUMENTS

| | | | | |
|---|---|---|---|---|
| 2012/0307673 | A1* | 12/2012 | Chang .............. | H04W 72/1205 370/252 |
| 2013/0250776 | A1* | 9/2013 | Hatefi ................ | H04B 7/15521 370/243 |
| 2013/0322321 | A1 | 12/2013 | Zhang et al. | |

OTHER PUBLICATIONS

Written Opinion dated Mar. 30, 2017, for corresponding International Application No. PCT/FR2016/053313 filed Dec. 9, 2016.
English translation of the Written Opinion dated Mar. 30, 2017, for corresponding International Application No. PCT/FR2016/053313 filed Dec. 9, 2016.
C. Lott, et al., "Hybrid ARQ: Theory, State of the Art and Future Directions", In IEEE Info. Theory Workshop on Info. Theory for Wireless Networks, Jul. 2007
Abdulaziz Mohamad et al., "Outage Analysis of Various Cooperative Strategies for the Multiple Access Multiple Relay Channel", In Proc. IEEE PIMRC'13, London UK, Sep. 2013.

\* cited by examiner

RELAYING METHOD AND DEVICE AND DESTINATION WITH FEEDBACK IN AN OMAMRC SYSTEM

CROSS-REFERENCE TO RELATED APPLICATIONS

This Application is a Section 371 National Stage Application of International Application No. PCT/FR2016/053313, filed Dec. 9, 2016, the content of which is incorporated herein by reference in its entirety, and published as WO 2017/098188 on Jun. 15, 2017, not in English.

FIELD OF THE DISCLOSURE

The present invention pertains to the field of digital communications. Within this field, the invention pertains more particularly to the transmission of coded data between sources and a destination with relaying by relays, the associated communications are termed cooperative. The invention relates to systems with several sources, one or more relays and a destination.

The principle of cooperation between nodes of a wireless network still forms the subject of active research. Although it is widely recognized that cooperation increases spectral efficiency by virtue of the coding gain and reliability by virtue of the diversity gain of the transmission, it remains to find a cooperation strategy which maximizes the gains.

Numerous relaying techniques exist, known by the English names: "amplify and forward", "decode and forward", "compress-and-forward", "non-orthogonal amplify and forward", "dynamic decode and forward", etc.

The invention applies especially, but not exclusively, to the transmission of data via mobile networks, for example for real-time applications, or via for example networks of sensors. The network is a multi-user network, consisting of several sources, one or more relays and a destination (MARC model illustrated by FIG. 1 or MAMRC - "Multiple-Access Multiple-Relay Channel" illustrated by FIG. 2 using a scheme for orthogonal multiple access of the transmission channel between the relays and the destination, denoted OMAMRC ("Orthogonal Multiple-Access Multiple-Relay Channel") when there are several relays. The transmission system considered comprises at least four nodes implementing a cooperation strategy termed IR-HARQ (Incremental Redundancy Hybrid-ARQ) based on selective relaying termed SDF (Selective Decode and Forward).

In this type of cooperation, the mutually independent sources broadcast their coded information sequences in the form of messages for the attention of a single destination and in the presence of relays. The relays of "Half Duplex" type (HD, (that is to say that a relay cannot receive and transmit simultaneously)) receive the messages from the sources, decode them and generate a message solely on the basis of the messages decoded without error from the sources. The relays thereafter access the channel in a mutually orthogonal manner so as to transmit their message to the destination. The selectivity of the relays means that a relay transmits a message only if it decodes at least one source without error. The links between the various nodes of the MARC or MAMRC system are subject to slow fading and to Gaussian white noise. Limited feedback is authorized from the destination to the sources and to the relays. The re-transmission of a source requested in the feedback signal is manifested as the transmission of a redundancy based on an incremental coding at the sources.

BACKGROUND OF THE DISCLOSURE

Among the so-called "Selective Decode and Forward (SDF)" techniques, there is known from [1] a method for improving SDF relaying for MARC systems. The authors consider a system with two sources A and B, a relay R and a destination D in which each node is half-duplex, it cannot receive and transmit at the same time, and wherein access to the channel between all the nodes is orthogonal according to a time division mode, TDD (Time Division Duplex). The relay performs a network coding, of XOR (exclusive OR) type as illustrated by FIG. 3.

According to the method described the sources A, B code their data as a word of length N partitioned into two frames, a so-called data frame and a so-called incremental redundancy frame. The sources transmit their data frame successively. The relay R and the destination D decode the frames received. By testing the CRC (Cyclic Redundancy Check), the relay and the destination determine whether the decoding is correct. The relay or the destination transmit feedback information based on their result of decoding the frames received. If the decoding is correct the feedback is an ACK message. If the decoding is erroneous the feedback message is an NACK with a retransmission request. The feedback message comprises two bits, one for source A, one for source B.

If the destination feeds back an ACK for both sources then the sources start a new cycle with the data which follow. The sources transmit their data frame successively.

Otherwise, the destination feeds back an NACK for one or both sources as a function of its decoding result. Either the relay performs a retransmission to the destination, or if the relay cannot help the destination, the corresponding source retransmits the original frame in the following cycle.

The authors distinguish three cases for the retransmission of the relay R. According to the first case, the destination D correctly decodes solely the source B and R correctly decodes solely the source A, or D correctly decodes neither A, nor B and R correctly decodes solely A. In this case, R regenerates the incremental redundancy frame $I_A$ on the basis of the decoded data of A and transmits $I_A$ to the destination. According to the second case, D correctly decodes solely A and R correctly decodes solely B, or D correctly decodes neither A, nor B and R correctly decodes solely B. In this case, R regenerates the incremental redundancy frame $I_B$ on the basis of the decoded data of B and transmits $I_B$ to the destination. According to the third case, D correctly decodes neither A, nor B and R correctly decodes A and B. In this case, R regenerates the incremental redundancy frames $I_A$ and $I_B$ on the basis of the decoded data of A and of B, performs a network coding of the two frames and transmits the coded signal to the destination.

The destination combines the incremental redundancy frame with the stored data frame and performs a soft-decision decoding.

According to the method described, the relay must take a decision to retransmit or not as a function of the feedback of the destination and of its decoding and the sources must take a decision to retransmit or to transmit new data as a function of the feedback of the destination and of the feedback of the relay.

SUMMARY

The present invention tends to improve the decoding efficiency at the destination while limiting the occupancy of the transmission channel and the feedback from the destination or from the relay.

For this purpose, the subject of the present invention is a method for relaying messages by a half-duplex relay intended for a telecommunication system with M sources, L relays and a destination, M>1, L≥1, according to a scheme for orthogonal multiple access of the transmission channel between the L relays and the destination. The method comprises the following steps:
- decoding by a relay of M messages each associated with a frame and originating from a source from among the M sources with detection of errors in the messages,
- transmission from the relay to the destination of a signal representative of at least one part of the set of those messages for which no error has been detected by the relay under condition of an authorization originating from the destination,
- transmission from the relay to the destination of a control signal indicating a set of messages for which no error has been detected by this relay, the transmission from the relay to the destination of the control signal occurring before the transmission of the representative signal.

The destination transmits an authorization to a relay to transmit its representative signal solely if it has not been able to decode without error the M messages of the M sources. Thus, the transmission of the representative signal of each relay is not systematic contrary to the known techniques, but is conditioned upon the authorization of the destination. As the destination has the knowledge of the set of messages decoded without error by each relay, it can determine which relay or relays can help it in its decoding and therefore authorize them to transmit their representative signal. Thus, the method makes it possible to achieve maximum efficiency by avoiding any occupancy of the channel by a transmission of one or more relays which would not help decoding at the destination. As soon as the destination has been able to decode without error the messages of the sources, it may thus no longer authorize any transmission by the relays to avoid any time loss. Consequently, the channel may be accessible very rapidly after the transmission by the sources of their message for a transmission of new messages by the sources.

According to one embodiment of the relaying method, the orthogonal multiple access scheme divides access to the channel into two phases, a first phase of M time slots corresponding to the transmission of the M messages by the M sources, a second phase of variable length corresponding to the conditional transmissions of the relays.

During the second phase the number of relay nodes authorized to transmit is variable.

According to one embodiment of the relaying method, the authorization originating from the destination comprises an identification of a selected node authorized to transmit.

This node may be a relay from among the L relays. This may equally well be a source which is authorized to re-transmit its message during the second phase.

According to one embodiment of the relaying method, the authorization originating from the destination furthermore comprises an indication of a set of messages to be selected by the relay from among its set of messages detected without error to generate its representative signal.

This mode is more particularly suitable for a system with several relays termed MAMRC. According to this mode, the destination not only authorizes the relay but furthermore it indicates to it from among its set of messages decoded without error those of the messages that it must use to generate its representative signal. This makes it possible to decrease the complexity of decoding of this signal by the destination and by the other relays. Furthermore, this indication originating from the destination allows the relay to best tailor its resources allocated to the coding of this signal.

According to one embodiment of the relaying method, the authorization originating from the destination furthermore comprises nominative control signals indicating correct decoding or otherwise of each of the M messages and in which the representative signal transmitted is generated on the basis of a set of messages updated on the basis of the nominative control signals received.

According to this mode, the destination informs that it has correctly decoded the message of a source by means of a control signal. The reception by the relay of this signal allows it to tailor its decoding and error detection resource to just the messages not yet decoded without error by the destination. According to this mode, the representative signal is generated on the basis of those messages for which no error has been detected by the relay but while discarding the messages already decoded correctly by the destination thereby making it possible to lighten the coding at the relay and the decoding at the destination.

According to one embodiment of the relaying method, the relay transmits the set updated on the basis of the nominative control signals received.

According to one embodiment of the relaying method, the relay transmits the set non-updated on the basis of the nominative control signals received.

According to one embodiment of the relaying method, the second phase can comprise conditional transmissions of the sources under condition of an authorization originating from the destination.

The relays may experience unfavorable conditions of radio propagation which imply that none of the relays has been able to decode without error a message decoded with error by the destination. Under these conditions, the transmission of a representative signal by the relays would not afford the destination any additional knowledge, it is therefore beneficial for the destination to request a transmission of the sources for which the receiver has not succeeded in decoding their message without error. This transmission relies on an incremental coding at the sources. The transmission by the sources then consists in transmitting a redundancy part.

According to one embodiment of the relaying method, the relay decodes M other messages originating respectively from the M sources and each associated with another frame immediately upon receipt of a control signal originating from the destination indicating correct decoding of the M messages.

According to this mode, the destination transmits the equivalent of an ACK signal which indicates that it has decoded without error all the messages of the sources. On receipt of this signal, the sources understand that they can therefore each switch to a new frame and transmit their associated message which will be decoded by the relay.

The present invention furthermore provides a relay intended for a telecommunication system with M sources, L relays and a destination, access to the transmission channel between the relays and the destination following an orthogonal multiple access scheme, for the implementation of a relaying method according to the invention. The relay comprises:

- a decoder of M messages transmitted by the M sources for obtaining estimated messages and for detecting errors in the estimated messages,
- a network coder for generating a signal representative of at least one part of the set of the messages estimated without error,
- a transmitter for transmitting a control signal indicating the set of those messages for which no error has been detected by the relay and for transmitting the representative signal,
- a controller of the transmitter so that the transmission of the control signal occurs before the transmission of the representative signal and so that the transmission of the representative signal is under condition of an authorization originating from the destination.

The present invention furthermore provides a destination device intended for a telecommunication system comprising M sources, L relays and the device, access to the transmission channel between the relays and the device following an orthogonal multiple access scheme. The device comprises:

- a decoder of messages transmitted by the sources for obtaining estimated messages and for detecting errors in the estimated messages,
- a receiver of the control signals transmitted by the relays for determining for each relay the set of those messages for which no error has been detected by this relay,
- a transmitter for transmitting an authorization to transmit to a relay if its set of messages comprises one of the messages estimated with error by the device.

The present invention furthermore provides a method for receiving messages by a destination intended for a telecommunication system with M sources, L relays and the destination, access to the transmission channel between the relays and the destination following an orthogonal multiple access scheme. The method comprises the following steps:

- decoding of messages transmitted by the sources to obtain estimated messages and to detect errors in the estimated messages,
- reception of control signals transmitted by the relays to determine for each relay a set of messages for which no error has been detected by this relay,
- transmission of an authorization to transmit to a relay if its set of messages comprises one of the messages estimated with error by the destination.

The present invention furthermore provides a system with M sources, L relays and a destination, $M \geq 1$, $L \geq 1$, in which the relays are relays of the invention and the destination is a destination device of the invention.

The present invention furthermore provides a method for transmitting messages by a source from among M sources and intended for a telecommunication system comprising the M sources, L relays and a destination, access to the transmission channel between the relays and the destination following an orthogonal multiple access scheme according to a dividing of access to the channel into two phases forming a frame, a first phase of M time slots corresponding to the transmission of the M messages by the M sources, a second phase of variable length corresponding to conditional transmissions of nodes taken from among the L relays and the M sources. The method comprises the following steps:

- after the transmission of a current message associated with a current frame, the successive transmission of a following message associated with a following frame subject to a feedback indicating that the destination has correctly decoded the M current messages or with the proviso that the maximum duration of the current frame is exceeded,
- a retransmission of the current message conditionally upon an authorization originating from the destination.

According to the transmission method, the source transmits its current message during the first phase of the current frame. The same holds for the other M-1 sources which share access to the channel. At the end of the second phase of the current frame, the source passes to the following message, that is to say that which comes after the current message which was sent during the first phase. The same holds for the other M-1 sources; the M sources transmit the message which follows the current message at each first phase of the frame which follows the current frame. During the second phase of the current frame, each of the sources may be able to re-transmit its current message under condition of an authorization originating from the destination.

According to one embodiment of the invention, the orthogonal multiple access scheme divides access to the channel into two phases, a first phase of M time slots corresponding to the transmission of the M messages by the M sources, a second phase of variable length corresponding to the conditional transmissions of the nodes taken from among the L relays and M sources.

According to one embodiment of the invention, the decoding at the destination as well as the generation of feedback messages result from a specific software application stored in the destination, a receiver of a base station for example. The execution of this software application is suited to the implementation of the reception method. The software application can be split into several applications, for example one for the decoding part, one for the feedback messages part.

According to one embodiment of the invention, the decoding, the generation of a representative signal and of a control signal at the relay results from a specific software application stored in the relay. The execution of this software application is suited to the implementation of the relaying method. The software application can be split into several applications, for example one for the decoding and signal generation part, one for the control message part.

The invention furthermore provides each of the specific software applications on an information medium, said applications comprising program instructions suitable for the implementation respectively of a relaying method and of a reception method when these applications are executed by processors.

The invention furthermore provides configured memories comprising instruction codes corresponding respectively to each of the specific applications.

The memory can be incorporated into any entity or device capable of storing the program. The memory maybe of ROM type, for example a CD ROM or a microelectronic circuit ROM, or else of magnetic magnetic type, for example a USB key or a hard disk.

Moreover, each specific application according to the invention can be downloaded from a server accessible on a network of Internet type.

The optional characteristics presented hereinabove within the framework of the relaying method may possibly be applied to the relay, to the application and to the memory that were mentioned hereinabove.

The present invention also pertains to a communication system comprising at least one relay and a destination according respectively the invention.

BRIEF DESCRIPTION OF THE DRAWINGS

Other characteristics and advantages of the invention will become more clearly apparent on reading the following description of embodiments given merely as illustrative and nonlimiting examples, and from the appended drawings, among which.

DETAILED DESCRIPTION OF ILLUSTRATIVE EMBODIMENTS

Figure 1:
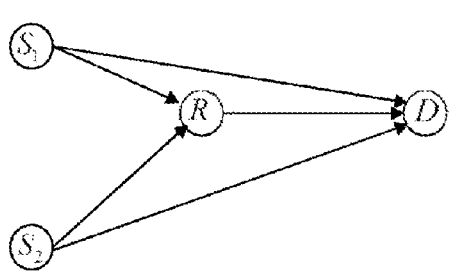
FIG. 1 is a diagram of a so-called MARC (Multiple Access Relay Channel) system according to the prior art.
Figure 2:
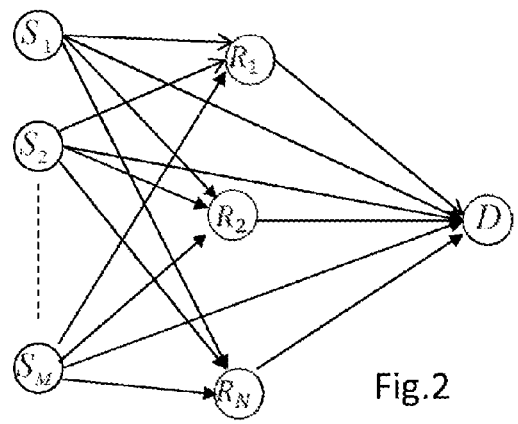
FIG. 2 is a diagram of a so-called MAMRC (Multiple Access Multiple Relays Channel) system according to the prior art.
Figure 3:
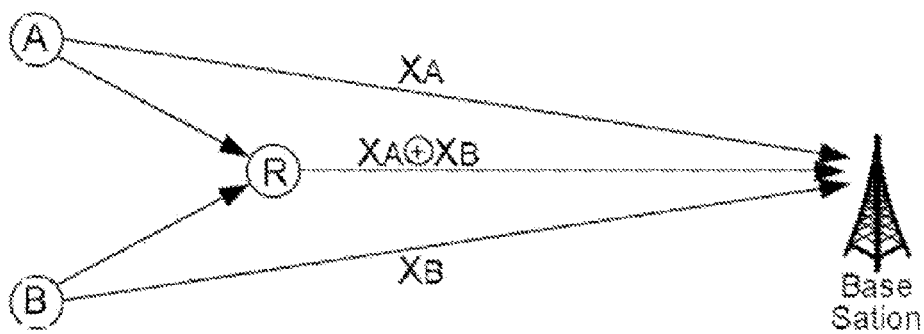
FIG. 3 is a diagram of a so-called MARC (Multiple Access Relay Channel) system according to the prior art with an XOR network coding at the relay, the destination being a base station.
Figure 4:
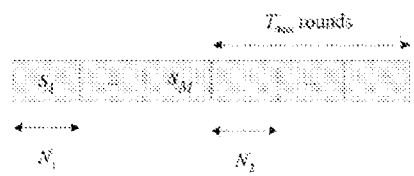
FIG. 4 is a diagram of a so-called MARC system implementing a method according to the invention.
Figure 4:
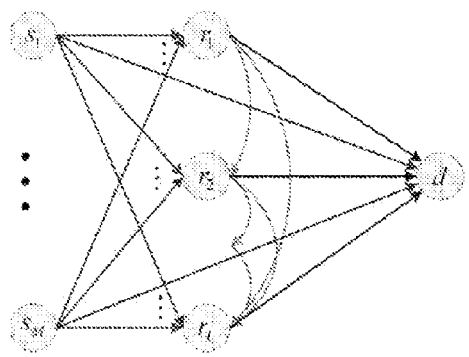

The invention is described in the context of a MAMRC system illustrated by FIG. 4. This system comprises M sources, L relays and a destination D.

By way of simplification of the description, the following assumptions are made hereinafter about the MAMRC ("Multiple-Access Multiple-Relay Channel") network:

- the sources, the relays are equipped with a single transmission antenna;
- the relays, and the destination are equipped with a single receive antenna;
- the sources, the relays, and the destination are perfectly synchronized;
- the sources are statistically independent (there is no correlation between them);
- use is made of a CRC code assumed to be included in the k information bits of each source so as to know whether a message is or is not correctly decoded;
- the links between the various nodes suffer from additive noise and fading. The fading gains are fixed for a frame of maximum duration $M+T_{max}$ time slots, but can change from one frame to another. $T_{max} \geq L$ is a parameter of the system;
- the quality of the channel in reception (CSIR Channel State Information at receiver) is available at the destination and at the relays;
- the feedbacks are error-free (no error in the control signals);
- all the time slots have one and the same duration.

The sources, nodes $S_i$, $i \in \{1, \ldots, M\}$, broadcast their coded information sequences for the attention of the relays, nodes $R_j$, $j \in \{1, \ldots, L\}$ and of a destination, node D. The M sources access the transmission channel towards the relays and the destination according to an orthogonal or non-orthogonal multiple access scheme (use of one and the same radio resource). The description which follows considers orthogonal access of the sources.

The L relays access the transmission channel towards the destination according to an orthogonal multiple access scheme which allows them to listen, without interference, to the transmissions of the other relays.

A frame uses time slots to transmit the M messages of respectively M sources. The maximum duration of a frame is $M+T_{max}$ time slots. Within one and the same frame, the transmissions are divided into two phases. The first phase comprises M time slots during which the sources each transmit in their turn their packet of K information bits, denoted $u_{S_i}$, $u_{S_i} \in \mathbb{F}_2^K$, $i \in \{1, \ldots, M\}$. The transmitted modulated symbols $x_{S_i}$ have lengths $N_1$ and the sources are assumed to be statistically independent ($\mathbb{F}_2$ being the Galois field with two elements). Each time slot has a duration of $N_1$ uses of the channel.

During channel use k, the signal transmitted in baseband by the node $A \in \{S_1, \ldots, S_M, R_1, \ldots, R_L\}$ and received by the node $B \in \{R_1, \ldots, R_L, D\}$ is denoted $y_{A,B,k}$, the static channel gain between the nodes A and B is denoted $h_{A,B}$, the white noise AWGN is denoted $n_{A,B,k}$, and the modulated symbol transmitted $X_{A,k}$ which is a complex, $X_{A,k} \in \mathbb{C}$. When a source transmits, the relays as well as the destination listen and attempt to decode the messages received at the end of each slot (round).

Each message $x_{S_1}, \ldots, x_{S_M}$ corresponding to a source $S_1, \ldots, S_M$, a correctly decoded message is regarded, by abuse of notation, as being the corresponding source.

By convention, $S_{B,t}$ denotes the set of messages (or sources) correctly decoded by the node $B \in \{R_1, \ldots, R_L, D\}$ at the end of the slot t. For the sake of simplicity in the description of the algorithms, it is agreed that $S_{S,t} = \{S\}$ for $S=S_1, \ldots, S_M$.

During the first phase, and during the time slot allotted to the source $S_i$, $i=1, \ldots, M$, the signal received at the node B can be written:

$$y_{S_i,B,k} = h_{S_i,B} x_{S_i,k} + n_{S_i,B,k} \qquad (1)$$

with $k=1, \ldots, N_1$.

At the end of the first phase, the set of the messages (or sources) correctly decoded by the node $B \in \{R_1, \ldots, R_L\} \cup \{D\}$ is denoted $S_{B,0}$. The set $S_{B,0}$ for $B \in \{R_1, \ldots, R_L\}$ is identified in a control signal sent by the node $B \in \{R_1, \ldots, R_L\}$.

The second phase comprises a maximum $T_{max}$ of time slots (rounds) $T_{max} \geq L$. Each slot (round) $t \in \{1, \ldots, T_{max}\}$ has a duration of $N_2$ channel uses. A control signal identifies the set $S_{B,t} \subseteq \{S_1, \ldots, S_M\}$, $1 \leq t \leq T_{max}$, of the messages (or sources) correctly decoded by the node $B \in \{R_1, \ldots, R_L\}$ at the end of the time slot (round) t.

The destination D decides the number of slots used during the second phase and the node which transmits at each slot during this phase with the aim of correctly decoding a maximum of messages of the sources. During this phase the relays access the channel according to an orthogonal multiple access scheme, they can help one another. When one relay transmits, the other relays as well as the destination listen and attempt to decode the messages received at the end of the slot (round). The relays which listen can utilize the signal received to improve their set of correctly decoded messages. A non-active relay acts as the destination in its decoding process. Thus, during the slot (round) $t \in \{1, \ldots, T_{max}\}$, i.e. $\hat{A}_t \in \{S_1, \ldots, S_M, R_1, \ldots, R_L\}$ the node selected by the destination to transmit, then the signal received at the node $B \in \{R_1, \ldots, R_L, D\} \setminus \{\hat{A}_t\}$ can be written:

$$y_{\hat{A}_t,B,k} = h_{\hat{A}_t,B} x_{\hat{A}_t,k} + n_{\hat{A}_t,B,k} \quad (2)$$

with $k=1, \ldots, N_2$.

The channel gain coefficients $h_{A,B}$ for all $A \in \{S_1, \ldots, S_M, R_1, \ldots, R_L\}$ and $B \in \{R_1, \ldots, R_L, D\}$ for A different from B are assumed to be independent and are assumed to follow a circular complex Gaussian probability distribution with zero mean and with variance $y_{A,B}$, denoted $CN(0, y_{A,B})$. The samples $n_{A,B,k}$ of additive white noise AWGN follow a probability distribution (pdf) $CN(0,1)$. The power of the symbols transmitted (per complex dimension) by the sources and by the relays is assumed to be normalized to unity. $y_{A,B}$ is the mean power received by the receiver of the node B of the signal transmitted by the transmitter of the node A. The fading and the path losses can be included in the expression for the variance $y_{A,B}$.

Figure 5:
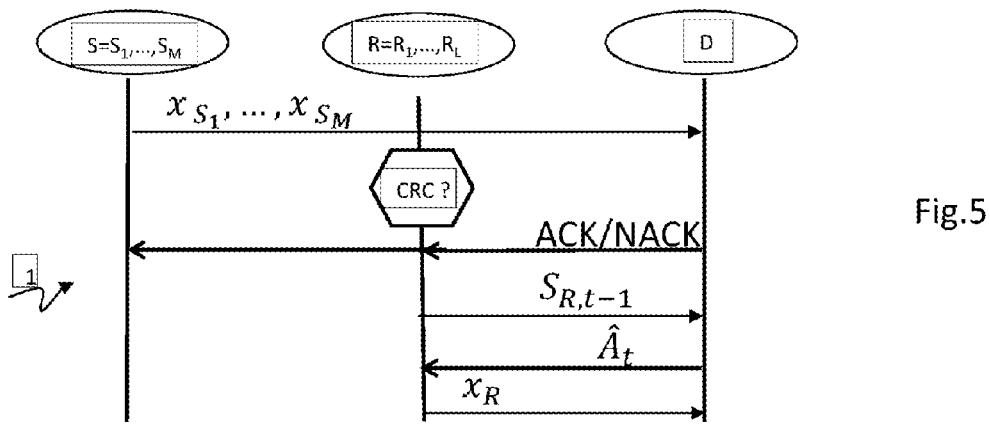
FIG. 5 illustrates a first embodiment of the method according to the present invention.

FIG. 5 illustrates the relaying method according to the invention according to a particular embodiment. The method for relaying messages by a half-duplex relay comprises the steps of decoding, of transmitting a representative signal and of transmitting a control signal.

The relay $R = R_1, \ldots, R_L$ decodes M messages each originating from a source from among the M sources with detection of errors in the messages. The error detection is done conventionally by utilizing a CRC.

The relay $R = R_1, \ldots, R_L$ transmits at the start of the current slot (round), t, towards the destination D a control signal identifying the set $S_{R,t-1} \subseteq \{S_1, \ldots, S_M\}$ of messages (which is regarded, by abuse of notation, as being the corresponding sources) for which no error has been detected by the relay at the end of the previous slot (round), t-1, $t \in \{1, \ldots, T_{max}\}$. According to a particular realization, the relay can, if it knows the messages decoded without error at the destination at t-1 ($S_{D,t-1}$), transmit $S_{R,t-1} \cap \overline{S}_{D,t-1}$, with $\overline{S}_{D,t-1} = \{S_1, \ldots, S_M\} \setminus S_{D,t-1}$ the complement of $S_{D,t-1}$ in the set of sources.

The transmission from the relay $R = R_1, \ldots, R_L$ towards the destination D of the control signal occurs before the transmission of a signal $x_R$ representative of at least part of those messages of the set for which no error has been detected by the relay R.

The relay $R = R_1, \ldots, R_L$ transmits the representative signal $x_R$ towards the destination D solely under condition of an authorization originating from the destination. The destination transmits its authorization which can take various forms. According to a first mode illustrated by FIGS. 5 and 6, the destination feeds back a control signal, ACK/NACK, indicating globally that it has or has not succeeded in decoding all the sources without error (based on the verification of the CRC) and, in the case where it has not succeeded in decoding all the sources without error, an identification of the node $\hat{A}_t$ selected which must retransmit. According to the embodiments illustrated by FIGS. 5 and 6, the selected node is a relay. According to a second mode illustrated by FIG. 7, the destination feeds back a particular (so-called nominative) control signal $ACK_i/NACK_i$ indicating that it has or has not succeeded in decoding the message of the source i without error (based on the verification of the CRC) and, in the case where it has not succeeded in decoding a message without error, an identification of the node $\hat{A}_t$ selected to retransmit. According to this mode, the method distinguishes as many different control signals $ACK_i/NACK_i$ as source nodes.

The relays receive the control signals ACK/NACK, $ACK_i/NACK_i$ broadcast by the destination to the sources.

As opposed to a data signal, a control signal is a signal which does not carry any useful data but control information sometimes termed out-of-band when the signal is transmitted with distinct frequency resources from those used for the useful data.

Figure 6:
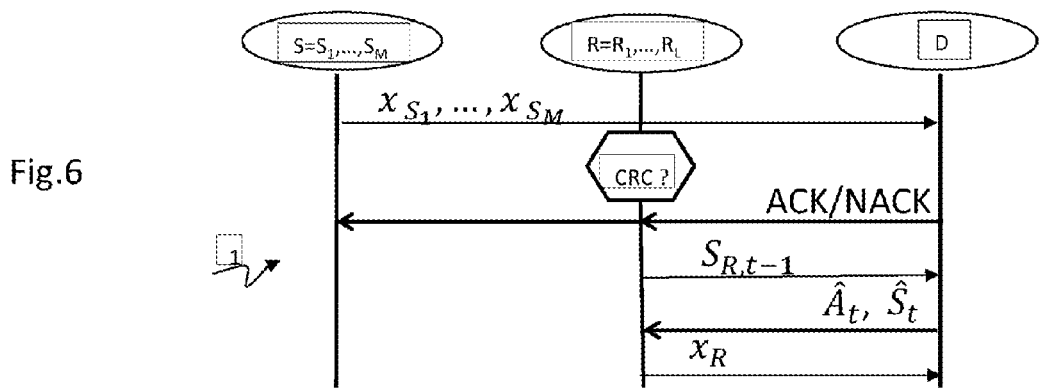
FIG. 6 illustrates a second embodiment of the method according to the present invention.
Figure 7:
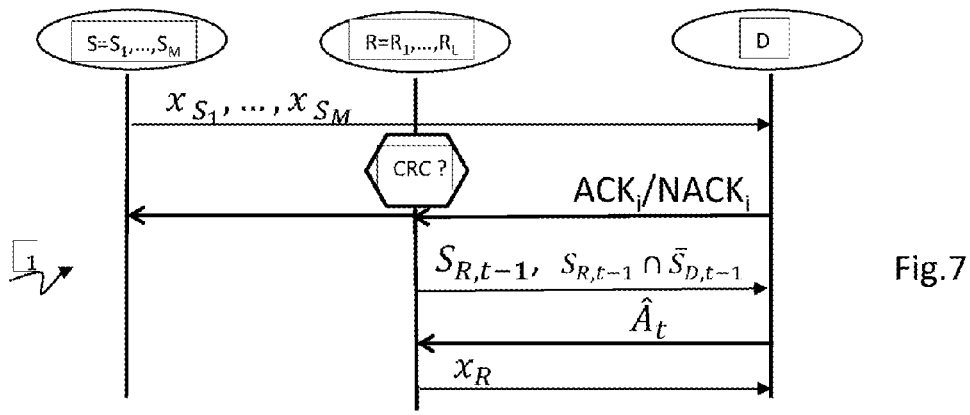
FIG. 7 illustrates a first node selection strategy according to the present invention.

According to a particular mode illustrated by FIG. 6, the destination selects not only the relay node $\hat{A}_t$ which must transmit at the current slot (round), t but furthermore the messages of the set $\hat{S}_t \subseteq S_{R,t-1}$ to be transmitted by this relay. As a function of the destination decision criterion, for example, minimize the probability of the event $E_t$, this may be $S_{R,t-1}$ or any subset of $S_{R,t-1}$.

The selection performed by the destination at the current slot (round), t takes account of its knowledge of the gains $h = [h_{S_1,D}, \ldots, h_{S_M,D}, h_{R_1,D}, \ldots, h_{R_L,D}]$ and, furthermore, of its knowledge of its past selections, of the sets of messages decoded correctly by the relays (regarded, by abuse of notation, as being the corresponding sources) and transmitted by the last control signals received and of the set of messages that it has decoded correctly (regarded, by abuse of notation, as being the corresponding sources): $P_{t-1} = \{(\hat{A}_1, \hat{S}_1), \ldots, (\hat{A}_{t-1}, \hat{S}_{t-1})\} \cup \{S_{R,t-1}, \forall R \in \{R_1, \ldots, R_L\}\} \cup S_{D,t-1}$. By convention, the knowledge set $P_0$ bundles solely $\{S_{B,0}, \forall B \in \{R_1, \ldots, R_L, D\}\}$ that is to say its knowledge of the sets of messages decoded correctly by the relays at the end of the first phase (transmitted by the control signals transmitted by the relays on completion of the first phase) and its knowledge of the set of messages that it has decoded correctly on completion of the first phase on the basis solely of the signals transmitted by the sources.

Let $E_t (h, A_t, S_t)$ be the event at the destination, conditioned by the knowledge of h and of $P_{t-1}$, indicating that at least one source is not decoded correctly by the destination at the end of the slot (round) t in the course of which the node $A_t$ is the active node, $S_t$ being the set of the sources helped by the node $A_t$. That is to say that the signal $x_{A_t}$ transmitted by the node $A_t$ is representative of the set $S_t$ of messages detected without error by the relay $A_t$. In a similar manner, let $O_{S,t}(h, A_t, S_t)$ be the event at the destination indicating that the source $S = S_1, \ldots, S_M$ is not decoded correctly.

With each event $A_t (h, \hat{A}_t, \hat{S}_t)$ is associated the probability $Pr\{A_t\}$ which can formally be defined as $\mathbb{E}_h(\mathbb{1}_{\{A_t(h,\hat{A}_t,\hat{S}_t)\}})$ with $\mathbb{E}_h(.)$ the expectation on h and with $\mathbb{1}_{\{A_t(h,\hat{A}_t,\hat{S}_t)\}} = 1$ if $A_t(h, \hat{A}_t, \hat{S}_t)$ is true and $\mathbb{1}_{\{A_t(h,\hat{A}_t,\hat{S}_t)\}} = 0$ otherwise. The probability $Pr\{A_t\}$ depends on the selection rules.

The authorization sent by the destination follows selection rules based on a strategy which consists in minimizing the probability $Pr\{E_t\}$ at each instant $t=1, \ldots, Tmax$.

Let T be the number of slots (round) conditional upon h and upon the selection rules. The mean number of retransmissions can be expressed in the form:

$$\mathbb{E}(T) = \sum_{t=1}^{T_{max}} t Pr\{T=t\}$$

$$\mathbb{E}(T) = \sum_{t=1}^{T_{max}} t Pr\{E_{t-1} \cap \overline{E}_t\} + T_{max} Pr\{E_{T_{max}}\}$$

$$\mathbb{E}(T) = \sum_{t=1}^{T_{max}-1} Pr\{E_t\} \quad (3)$$

The minimum and maximum transmission bitrates (in number of bits per channel use (b.c.u.) are defined as being equal to: $R_{max} = K/N_1$ and $R_{min} = M R_{max}/(M+T_{max}\alpha)$ with $\alpha = N_2/N_1$. The mean transmission bitrate can express in the form:

$$\overline{R} = M R_{max}/(M+\alpha \mathbb{E}(T)) \quad (4)$$

The expected number of information bits received during each frame is given by:

$$\Sigma_{S \in \{S_1, \ldots, S_M\}} K(1 - Pr\{O_{S,T_{max}}\})$$

Thus, the spectral efficiency can be defined by:

$$\eta = \frac{1}{M} \overline{R} \sum_{S \in \{S_1, \ldots, S_M\}} K(1 - Pr\{O_{S,T_{max}}\}) \quad (5)$$

The selection rules therefore consist in maximizing the spectral efficiency defined by equation (5).

Two types of relay are considered hereinafter to illustrate the rules.

The instantaneous mutual information between the node $A \in \{S_1, \ldots, S_M\} \cup \{R_1, \ldots, R_L\}$ which transmits and the node $B \in \{R_1, \ldots, R_L\} \cup \{D\}$ which receives is denoted $I_{A,B}$. This mutual information depends on the value of the fading of the channel $h_{A,B}$, the SNR $y_{A,B}$, and the modulation assumption at the input of the channel.

The first type is termed DCC/JDCD, distributed channel coding/joint distributed channel decoding. The second type is termed JNCC/JNCD, joint network channel coding/joint network channel decoding.

For the DCC/JDCD type, the representative signal transmitted by the selected relay $\hat{A}_l$ is a concatenation of correctly decoded messages which each correspond to a correctly decoded source and which therefore form part of the selected set $\hat{S}_l$, $l \in \{1, \ldots, t-1\}$.

Omitting the channel for the sake of simplifying the expressions, the common outage event $E_t(A_t, S_t)$ can be expressed in the form:

$$E_t(A_t, S_t) = \{R_{max} > I_t^c(A_t, S_t)\} \quad (6)$$

with $$I_t^c(A_t, S_t) = \min_{S \in \overline{S}_{D,t-1}} \left( I_{S,D} + \sum_{l=1}^{t-1} \frac{\alpha}{|\hat{S}_l|} I_{\hat{A}_l,D} \mathbb{1}_{\{S \in \hat{S}_l\}} + \frac{\alpha}{|S_t|} I_{A_t,D} \mathbb{1}_{\{S \in S_t\}} \right) \quad (7)$$

with $\overline{S}_{D,t-1} = \{S_1, \ldots, S_M\} \setminus S_{D,t-1}$ the complement of $S_{D,t-i}$ in the set of sources.

The individual outage event can be expressed in a similar manner in the form:

$$O_{s,t}(A_t, S_t) = \{R_{max} > I_t^S(i\ A_t, S_t)\} \quad (8)$$

with $$I_t^S(A_t, S_t) = I_{S,D} + \sum_{l=1}^{t-1} \frac{\alpha}{|\hat{S}_l|} I_{\hat{A}_l,D} \mathbb{1}_{\{S \in \hat{S}_l\}} + \frac{\alpha}{|S_t|} I_{A_t,D} \mathbb{1}_{\{S \in S_t\}} \quad (9)$$

For the JNCC/JNCD type, the representative signal transmitted by the selected relay $\hat{A}_l$ and the messages transmitted by the sources corresponding to the selected set $\hat{S}_l$ form a mode of joint code of the messages of the sources $\hat{S}_l$, $l \in \{1, \ldots, t-1\}$.

In this case, the expressions of $I_t^S(A_t, S_t)$ and of $I_t^c(A_t, S_t)$ are given in [2] and can be expressed in the form:

$$I_t^c(A_t, S_t) = \min_{U \subseteq \overline{S}_{D,t-1}} \frac{1}{|U|} \left( \Sigma_{S \in U} I_{S,D} + \sum_{l=1}^{t-1} \alpha I_{\hat{A}_l,D} \mathbb{1}_{\{U \cap \hat{S}_l \neq \emptyset\}} + \alpha I_{A_t,D} \mathbb{1}_{\{U \cap S_t \neq \emptyset\}} \right) \quad (10)$$

$$I_t^S(A_t, S_t) = \max_{\mathcal{J} \subseteq \overline{S}_{D,t-1}} \min_{U \subseteq \mathcal{J}, S \in U} \frac{1}{|U|} \quad (11)$$

$$\left( \Sigma_{S \in U} I_{S,D} + \sum_{l=1}^{t-1} \alpha I_{\hat{A}_l,D} \mathbb{1}_{\{\hat{C}_l\}} + \alpha I_{A_t,D} \mathbb{1}_{\{U \hat{C}_t\}} \right)$$

with $\overline{\mathcal{J}} = \overline{S}_{D,t-1} \setminus \mathcal{J}$ with $\hat{C}_l = \{\{\mu \cap \hat{S}_l \neq \emptyset\} \text{ and } \{\overline{\mathcal{J}} \cap \hat{S}_l \neq \emptyset\}\}$ with $C_t = \{\{\mu \cap \hat{S}_t \neq \emptyset\} \text{ and } \{\overline{\mathcal{J}} \cap \hat{S}_t \neq \emptyset\}\}$ The maximization of $I_t^c(A_t, S_t)$ for each channel realization h conditional upon $P_{t-1}$ minimizes the probability of common outage $Pr\{E_t\}$ which is the criterion adopted for maximizing the spectral efficiency defined by equation (5). Indeed, $Pr\{O_{s,t}\} \leq Pr\{E_t\}$ for each source $S \in \{S_1, \ldots, S_M\}$.

According to a first strategy illustrated by FIG. 5, if the destination has not correctly decoded all the sources at the start of the current slot $t=1, \ldots, T_{max}$, it transmits an ACK/NACK feedback signal. On receipt of this signal, the relays transmit to the destination an up-to-date version of their set of correctly decoded messages. The destination chooses the node $A_t \in \{R_L\} \ldots, \cup \hat{S}_{D,t-1}$ which maximizes $I_t^c(A_t, S_{A_t,t-1})$. In this case, the node selection rule can be written in the form:

$$\hat{A}_t = \arg \max_{A_t \in \{R_1, \ldots, R_L\} \cup \{\overline{S}_{D,t-1}\}} I_t^c(A_t, S_{A_t, t-1}) \quad (12)$$

with $\hat{S}_t = S_{\hat{A}_t, t-1}$, that is to say that the relay helps all the sources that it has correctly decoded.

According to a second strategy built on the first strategy and illustrated by FIG. 6, the destination selects a relay $\hat{A}_t$ and the set of sources $\hat{S}_t$ that the relay must help, that is to say that in this case the relay generates its representative signal on just a part of the messages decoded without error if the set $\hat{S}_t$ is different from the set $S_{R,t-1}$. The selection rule for the node and sources can be written in the form:

$$(\hat{A}_t, \hat{S}_t) = \arg \max_{A_t \in \{R_1, \ldots, R_L\} \cup \{\overline{S}_{D,t-1}\}, S_t \subseteq S_{At,t-1}} I_t^c(A_t, S_t) \quad (13)$$

A third strategy is based on the second strategy but attempts to reduce the signaling requirement (control signals). According to this third strategy illustrated by FIG. 7, at the start of each slot (round) t, the destination dispatches a nominative signal $ACK_i/NACK_i$ to the sources indicating whether they are or are not decoded without error. The relays listen and can thus deduce therefrom the set $S_{D,t-1}$ of messages detected without error by the destination. If this set is complete then the relays can refrain from transmitting their control signal. Otherwise, the set is not complete, the relays transmit either their set $S_{R,t-1}$ of messages decoded without error, or an update of their set $S_{R,t-1} \cap \overline{S}_{D,t-1}$ of messages decoded without error via their control signal. The destination selects the node $A_t \in \{R_1, \ldots, R_L\} \cup \{\overline{S}_{D,t-1}\}$ knowing that this selected node will cooperate with the sources of $S_{A_t,t-1} \cap \overline{S}_{D,t-1}$.

The selection rule can thus be cast in the form:

$$\hat{A}_t = \arg \max_{A_t \in \{R_1, \ldots, R_L\} \cup 55 \overline{S}_{D,t-1}} I_t^c(A_t, \overline{S}_{D,t-1} \cap \hat{S}_{A_t,t-1}) \quad (14)$$

with $\hat{S}_t = \overline{S}_{D,t-1} \cap S_{\hat{A}_t,t-1}$, that is to say that the relay helps all the sources that it has correctly decoded less those already correctly decoded by the destination.

Annex A gives a pseudo code for running the selection implemented by the destination according to the third strategy.

Figure 8:
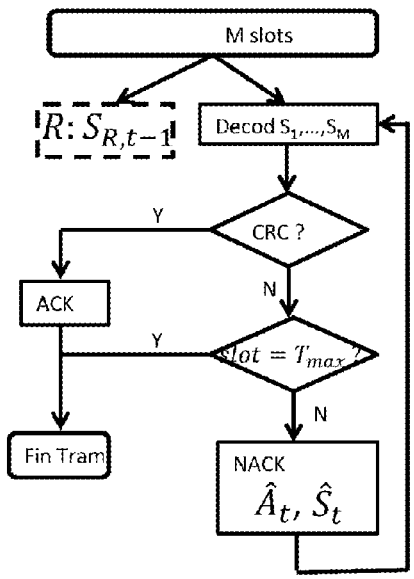
FIG. 8 illustrates an embodiment of a reception method implemented by the destination D according to the invention.

FIG. 8 illustrates an embodiment of a reception method implemented by the destination D according to the invention. The illustration shows the run diagrammatically from the end of the first phase, that is to say end of the M slots. The destination decodes all the messages received and performs a test of the CRC of each of the messages. In parallel, each relay R=$R_1, \ldots, R_L$ transmits at the start of the current slot (round), t, to the destination D a control signal identifying the set $S_{R,t-1} \subseteq \{S_1, \ldots, S_M\}$ of messages that it has decoded without error.

When the destination has succeeded in decoding all the sources without error, branch Y arising from the test of the CRC, it feeds a control signal, ACK, back to the sources and to the relays, indicating globally that it has succeeded in decoding all the sources without error. This ACK signal indicates the end of the frame in progress. The transmission is then continued with a new frame.

When the destination has not succeeded in decoding all the sources without error, branch N arising from the test of the CRC, it performs a test on the elapsed time.

When the current slot is the last of the slots of the second phase, then it places itself on standby awaiting the next frame, Fram End, branch Y arising from the test on the slot, slot=$T_{max}$?

When the current slot is not the last of the slots of the second phase, then it transmits an NACK signal indicating globally that it has not succeeded in decoding all the sources without error and a selection of a node $\hat{A}_t$. If this node is a relay then the selection of the node is enriched with a selection of a set $\hat{S}_t$ of messages.

The destination then again attempts to decode the messages of the sources by utilizing the signal transmitted by the node $\hat{A}_t$, that is to say, if the node is a source then the signal is the retransmission of the message of the source and if the node is a relay then the signal is the signal representative of the set.

Figure 9:
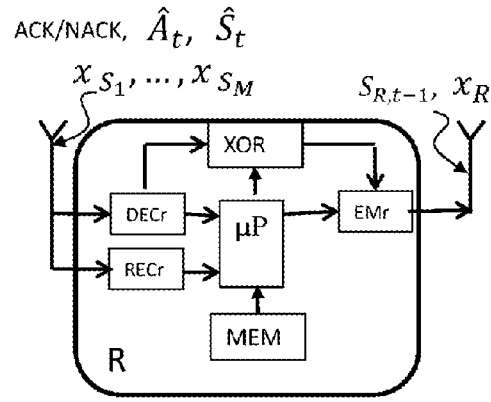
FIG. 9 is a diagram of a relay R according to the invention.

FIG. 9 is a diagram of a relay R according to the invention able to cooperate with M sources $S_1, \ldots, S_M$ and L-1 relays $R_1, \ldots, R_{L-1}$ and a destination D of an OMAMRC system for the implementation of a relaying method according to the invention. The relaying method is implemented by the activation of a specific software application following for example the activation of an icon with shortcut displayed on the screen of the relay.

The relay R comprises a receiver REC, a decoder DEC, a microprocessor μP, a network coder XOR, a memory MEM and a transmitter EM. The specific software application is stored in the memory MEM. The execution of this software application by the microprocessor μP implements:
  the decoding by the decoder DEC of M messages each associated with a frame and originating from a source from among the M sources with detection of errors in the messages,
  the network coding by the XOR network coder of at least one part $\hat{S}_t$ of the set of those messages for which no error has been detected by the relay to generate a representative signal $x_R$,
  the transmission by the transmitter EM to the destination of the representative signal $x_R$ under condition of an authorization ACK/NACK, $\hat{A}_t$ originating from the destination,
  the transmission by the transmitter EM to the destination of a control signal indicating the set $S_{R,t-1}$ of those messages for which no error has been detected by this relay, this transmission of the control signal occurring before the transmission of the representative signal.

Figure 10:
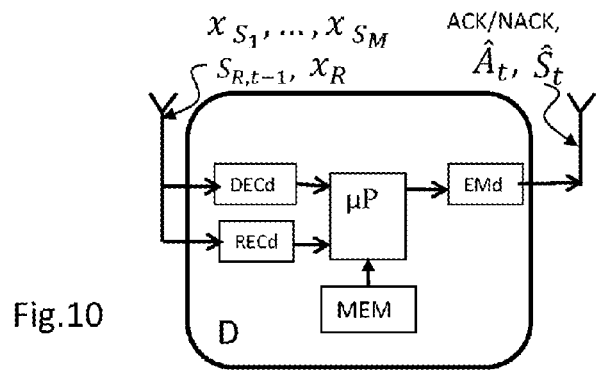
FIG. 10 is a diagram of a destination device D according to the invention.

FIG. 10 is a diagram of a destination device D according to the invention able to cooperate with M sources $S_1, \ldots, S_M$ and L relays $R_1, \ldots, R_L$ of an OMAMRC system for the implementation of a relaying method according to the invention. During this cooperation, the device D implements a method for receiving messages. The method for receiving messages is implemented by the activation of a specific software application following for example the activation of an icon with shortcut displayed on the screen of the device.

The device D comprises a receiver REC, a decoder DEC, a microprocessor μP a memory MEM and a transmitter EM. The specific software application is stored in the memory MEM. The execution of this software application by the microprocessor μP implements:
  the decoding by the decoder DEC of the messages transmitted by the sources $S_1, \ldots, S_M$ to obtain estimated messages and to detect errors in the estimated messages,
  the reception by the receiver REC of control signals transmitted by the relays to determine for each relay the set $S_{R,t-1}$ of those messages for which no error has been detected by this relay,
  the transmission by the transmitter EM of a feedback message ACK/NACK, $\hat{A}_t$, to authorize a relay to transmit if its set $S_{R,t-1}$ of messages comprises one of the messages estimated with error by the device D.

According to one embodiment of the software application, its implementation furthermore allows the decoding by the decoder DEC of the representative signals $x_R$ transmitted by the relays as well as the indication in the feedback message of the selection of the set $\hat{S}_t$ of sources that the relay must help.

Simulations have been performed with, under the assumption of a Gaussian distribution of the modulation at input, the following conditions. This distribution at input maximizes the mutual information which becomes, by definition, the capacity and is expressed in the form $I_{A,B}=\log(1+|h_{A,B}|^2)$. The simulated system is an OMAMRC system with three sources, three relays and a destination. The parameters are $T_{max}=3$, $R_{max}=1$ (b. c. u.) and α=0.5.

Figure 11:
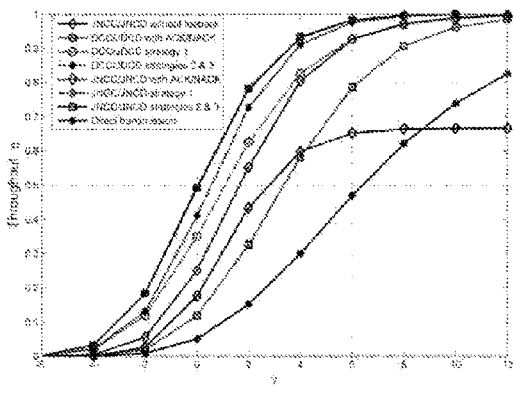
FIG. 11 groups together the bitrate η curves for the various feedback strategies according to the invention.

FIG. 11 groups together the bitrate η curves for the various feedback strategies according to the invention, the curve obtained with a system without cooperation without feedback and the curve obtained with a cooperation system without feedback. These bitrate η curves show that at high SNR, the bitrate of the direct transmissions (without cooperation of the relays) becomes greater than the transmissions without feedback. The bitrate obtained with the feedback strategy (according to the invention) based on JNCC/JNCD relaying exceeds that of the feedback strategy based on DCC/JDCD relaying. The results obtained with the second and third strategies according to the invention achieve equivalent bitrate performance whether for JNCC/JNCD relaying, or for DCC/JDCD relaying. For DCC/JDCD relaying, the second and third strategies according to the invention give the best performance. For JNCC/JNCD relaying, the second and third strategies according to the invention have performance very close to that obtained with the first strategy according to the invention.

Figure 12:
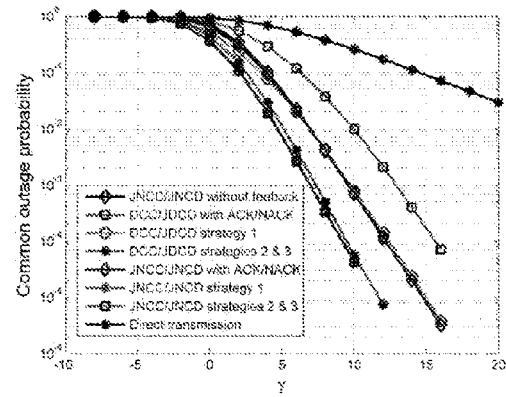
FIG. 12 groups together the curves of probability of common outage $\Pr\{E_{T_{max}}\}$ at the destination.

FIG. 12 groups together the curves of probability of common outage $\Pr\{E_{T_{max}}\}$ at the destination. All the cooperation schemes with or without feedback have the same order of diversity equal to L+1 whilst the scheme without cooperation without feedback (direct transmission) has a diversity of one.

Each of the sources may for example be a mobile terminal of a communication network. The relay may for example be a "lightened" base station or a terminal, and the destination may for example be a base station.

As a variant, each of the sources may for example be a base station. The relay may for example be a "lightened" base station or a terminal, and the destination may for example be a terminal.

In these various configurations, the destination may turn out to be a concentrator node, in the sense that it receives messages from all the sources, which is able to decode all the messages received in a joint manner.

The invention is described in the foregoing by way of example. Different variants of the invention may be envisaged without however departing from the scope of the patent.

REFERENCES

[1] C. Lott, Milenkovic O, and E. Soljanin. Hybrid arq: Theory, state of the art and future directions. In IEEE Info. Theory Workshop on Info. Theory for Wireless Networks, 2007, July 2007

[2] Abdulaziz Mohamad, Raphael Visoz, and Antoine O. Berthet. Outage analysis of various cooperative strategies for the multiple access multiple relay channel. In Proc. IEEE PIMRC'13, London, UK, September 2013.

---

Annex A
At each start of round t
(initialization)
$I_{max} = 0$
For each node $A_t \in \{R_1, ..., R_L\} \cup \{\overline{S}_{D,t-1}\}$ Do :
 calculate $I_t^c(A_t, \overline{S}_{D,t-1} \cap S_{A_t,t-1})$ using (7) or (10)
 if $I_t^c(A_t, \overline{S}_{D,t-1} \cap S_{A_t,t-1}) > I_{max}$ then
  $I_{max} = I_t^c(A_t, \overline{S}_{D,t-1} \cap S_{A_t,t-1})$
  $A_t = A_t$
End For

---

Although the present disclosure has been described with reference to one or more examples, workers skilled in the art will recognize that changes may be made in form and detail without departing from the scope of the disclosure and/or the appended claims.

The invention claimed is:

1. A method of relaying messages by a half-duplex relay for a telecommunication system with M sources, at least one half-duplex relay and a destination, M>1, according to a scheme for orthogonal multiple access of the transmission channel between the at least one half-duplex relay and the destination, comprising the following acts:
 decoding by the at least one half-duplex relay M messages each associated with a frame and originating from a source from among the M sources with detection of errors in the decoded messages,
 transmitting from the at least one half-duplex relay to the destination a control signal carrying only control information indicating a set of decoded messages for which no error has been detected by this half-duplex relay,
 after transmitting the control signal and receiving a feedback control signal from the destination in response to the transmitted control signal, transmitting from the at least one half-duplex relay to the destination a signal representative of at least one part of the set of those decoded messages for which no error has been detected by the at least one half-duplex relay solely under condition of an authorization originating from the destination given by way of the feedback control signal.

2. The method of relaying as claimed in claim 1 in which the orthogonal multiple access scheme divides the access to the channel into two phases, a first phase of M time slots corresponding to the transmission of the M messages by the M sources, a second phase of variable length corresponding to the conditional transmissions of the at least one half-duplex relay.

3. The method of relaying as claimed in claim 1 in which the authorization originating from the destination comprises an identification of a selected node authorized to transmit.

4. The method of relaying as claimed in claim 1 in which the authorization originating from the destination furthermore comprises an indication of a set of decoded messages for which no error has been detected to be selected by the at least one half-duplex relay to generate the representative signal.

5. The method of relaying as claimed in claim 3 in which the authorization originating from the destination is given by way of nominative feedback control signals indicating decoding without detected error or otherwise of each of the M messages and in which the representative signal transmitted is generated on the basis of a set of messages updated on the basis of the nominative feedback control signals received.

6. The method of relaying as claimed in claim 5 in which the at least one half-duplex relay transmits the set non-updated on the basis of the nominative feedback control signals received.

7. The method of relaying as claimed in claim 5 in which the at least one half-duplex relay transmits the set updated on the basis of the nominative feedback control signals received.

8. The method of relaying as claimed in claim 2, in which the second phase comprises conditional transmissions of the sources under condition of an authorization originating from the destination.

9. The method of relaying as claimed in claim 1 in which the at least one half-duplex relay decodes M other messages originating respectively from the M sources and each associated with another frame immediately upon receipt of a feedback control signal originating from the destination indicating decoding of the M messages without detection of error.

10. A half-duplex relay for a telecommunication system with M sources, at least the half-duplex relay and a destination, access to the transmission channel between the half-duplex relay and the destination following an orthogonal multiple access scheme, the half-duplex relay comprising:
 a decoder of M messages transmitted by the M sources which obtains decoded messages and detects errors in the decoded messages,
 a network coder which generates a signal representative of at least one part of a set of the decoded messages for which no error has been detected,
 a transmitter,
 a controller of the transmitter configured to:
  transmit a control signal carrying only control information indicating the set of those decoded messages for which no error has been detected by the half-duplex relay and for transmitting the representative signal; and
  after transmitting the control signal and receiving a feedback control signal from the destination in response to the transmitted control signal, transmit from the half-duplex relay to the destination the representative signal solely under condition of an authorization originating from the destination given by way of the feedback control signal.

* * * * *